United States Patent
Yu et al.

(10) Patent No.: US 12,118,483 B2
(45) Date of Patent: Oct. 15, 2024

(54) MULTI-DEVICE SITE SELECTION METHOD FOR INTEGRATED ENERGY VIRTUAL POWER PLANT

(71) Applicant: SOUTHEAST UNIVERSITY, Jiangsu (CN)

(72) Inventors: Jie Yu, Jiangsu (CN); Xinsen Zhang, Jiangsu (CN); Yang Li, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 396 days.

(21) Appl. No.: 17/633,343

(22) PCT Filed: May 10, 2021

(86) PCT No.: PCT/CN2021/092824
§ 371 (c)(1),
(2) Date: Feb. 7, 2022

(87) PCT Pub. No.: WO2022/193422
PCT Pub. Date: Sep. 22, 2022

(65) Prior Publication Data
US 2023/0245006 A1    Aug. 3, 2023

(30) Foreign Application Priority Data
Mar. 17, 2021    (CN) .......................... 202110338284.5

(51) Int. Cl.
*G06Q 10/04* (2023.01)
*G05B 19/042* (2006.01)
(Continued)

(52) U.S. Cl.
CPC ........... *G06Q 10/04* (2013.01); *G05B 19/042* (2013.01); *G05B 2219/2639* (2013.01)

(58) Field of Classification Search
CPC ...... G06Q 10/04; G06Q 10/043; G06Q 50/06; G05B 19/042; G05B 2219/2639; G05B 17/02; Y04S 10/50
(Continued)

(56) References Cited

U.S. PATENT DOCUMENTS 8,401,709 B2 *   3/2013   Cherian ............ H02J 13/00017
                                                            700/291
9,536,021 B1 *   1/2017   Link ........................ G06N 5/01
(Continued)

FOREIGN PATENT DOCUMENTS

CN          105576710 A          5/2016
CN          108197768 A          6/2018
(Continued)

*Primary Examiner* — Michael J Brown
(74) *Attorney, Agent, or Firm* — Muncy, Geissler, Olds & Lowe, P.C.

(57) ABSTRACT

The present invention discloses a multi-device site selection method for an integrated energy virtual power plant, and belongs to the field of virtual power plants. The multi-device site selection method for an integrated energy virtual power plant includes the following steps: constructing a calculation method for calculating a comprehensive energy flow distribution entropy through power flow distribution in a power distribution network and flow distribution in a heat distribution network, to reflect energy distribution balance in an energy network; under a condition that capacity of each device is known, establishing a multi-device site selection optimal planning model of the integrated energy virtual power plant with a goal of maximizing a comprehensive energy flow distribution entropy index; and determining an installation location of each device of the integrated energy virtual power plant in the energy network, and determining an operating state of each device.

7 Claims, 1 Drawing Sheet

(51) Int. Cl.
*G05B 17/02* (2006.01)
*G06Q 50/06* (2024.01)
(58) Field of Classification Search
USPC .......................................... 700/295
See application file for complete search history.

(56) References Cited

U.S. PATENT DOCUMENTS

| | | | | |
|---|---|---|---|---|
| 11,637,446 B2* | 4/2023 | Khodaei | ........... | H02J 13/00002 |
| | | | | 700/295 |
| 2020/0212681 A1* | 7/2020 | Zhuo | ................ | G06Q 10/06375 |

FOREIGN PATENT DOCUMENTS

| | | | |
|---|---|---|---|
| CN | 111539599 A | | 8/2020 |
| CN | 111931977 A | | 11/2020 |
| KR | 20140048610 A | | 4/2014 |

* cited by examiner

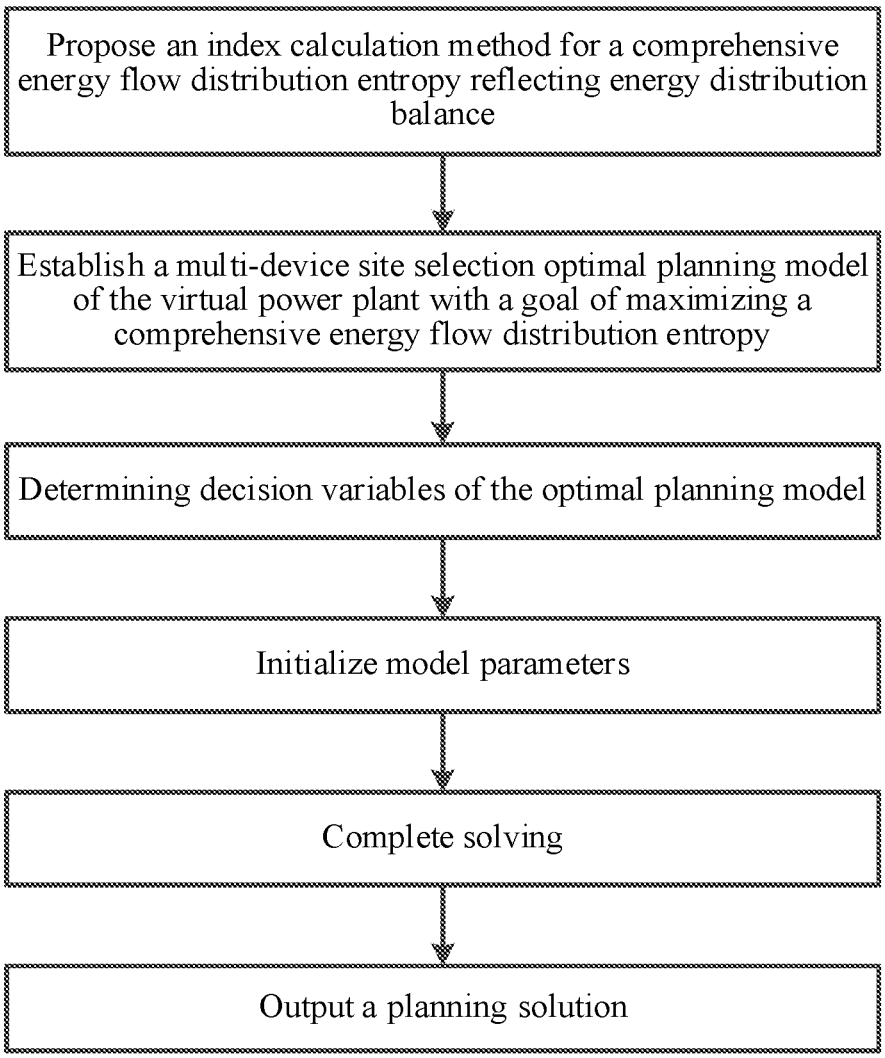

US 12,118,483 B2

MULTI-DEVICE SITE SELECTION METHOD FOR INTEGRATED ENERGY VIRTUAL POWER PLANT

TECHNICAL FIELD

The present invention relates to the field of virtual power plants, and specifically to, a multi-device site selection method for an integrated energy virtual power plant.

BACKGROUND

A virtual power plant integrates distributed energy sources such as gas generator sets, intermittent renewable energy generator sets, and controllable loads through advanced communication technologies and software systems for unified management. Due to the inherent good properties of these distributed energy sources, the virtual power plant can obtain economic or environmental benefits by properly dispatching the distributed energy sources through a power system. Meanwhile, to better realize the complementary coordination between energy sources in the integrated energy network and improve energy utilization efficiency, a gas boiler, a combined heat and power generation device, and a refrigeration device in the virtual power plant couple the electrical load, thermal load, and cooling load in the region, to strengthen the connection between a plurality of energy sources, so that the virtual power plant gradually develops from a single electric energy to an integrated energy virtual power plant.

At present, the research content of virtual power plants is mostly focused on the optimal dispatching and transaction bidding, while relatively little work has been done on the optimal planning of virtual power plants. In addition, the existing research on the optimal planning of virtual power plants involves most of the device site selection problems with the goal of reducing losses, that is, economic considerations. However, the virtual power plant is a physical system that actually operates, and the planning with the goal of single economy ignores safety considerations to a certain extent.

Most of the existing researches on optimal planning of virtual power plants do not consider improving the operating state of the energy network. In fact, virtual power plants exist in the actual energy network. The more uniform the energy distribution in the entire energy network, the more stable the system. How to consider the balance of energy distribution in the energy network during virtual power plant planning is a question worth considering during virtual power plant planning.

SUMMARY

For defects of the existing technology, the present invention proposes a multi-device site selection method for an integrated energy virtual power plant.

The objective of the present invention can be achieved by the following technical solution:

A multi-device site selection method for an integrated energy virtual power plant is provided, including:

step 1: constructing a calculation method for calculating a comprehensive energy flow distribution entropy through power flow distribution in a power distribution network and flow distribution in a heat distribution network, to reflect energy distribution balance in an energy network;

step 2: under a condition that capacity of each device is known, establishing a multi-device site selection optimal planning model of the integrated energy virtual power plant with a goal of maximizing a comprehensive energy flow distribution entropy index; and step 3: determining an installation location of each device of the integrated energy virtual power plant in the energy network, and determining an operating state of each device.

A multi-device site selection method for an integrated energy virtual power plant according to the foregoing description is provided, where in the multi-device site selection optimal planning model of the virtual power plant, a device site selection state and a device operating state are taken as decision variables.

A multi-device site selection method for an integrated energy virtual power plant according to the foregoing description is provided, where the calculation method is:

$$E^t = E_e^t + E_h^t, \quad (1)$$

in the formula, $E^t$ represents the comprehensive energy flow distribution entropy of the power distribution network and the heat distribution network at a moment t; $E_e^t$ represents an energy flow distribution entropy in the power distribution network at the moment t; and $E_h^t$ represents an energy flow distribution entropy in the heat distribution network at the moment t;

$$E_e^t = -\sum_{l=1}^{N_l} \frac{\Delta P^{l,t}}{\Delta P_{total}^{l,t}} \ln\left(\frac{\Delta P^{l,t}}{\Delta P_{total}^{l,t}}\right) \quad (2)$$

in the formula, $N_l$ represents a total quantity of branches of the power distribution network; l represents a serial number of a branch; $\Delta P^{l,t}$ represents an active power for transmission on the branch l at the moment t; and $\Delta P_{total}^{l,t}$ represents an active power for transmission in the entire power distribution network at the moment t; and $$E_h^t = -\sum_{p=1}^{N_p} \frac{\Delta m^{p,t}}{\Delta m_{total}^{p,t}} \ln\left(\frac{\Delta m^{p,t}}{\Delta m_{total}^{p,t}}\right) \quad (3)$$

in the formula, $N_p$ represents a total quantity of pipelines of the heat distribution network; p represents a serial number of a pipeline; $\Delta m^{p,t}$ represents a flow for transmission on the pipeline p at the moment t; and $\Delta m_{total}^{p,t}$ represents a flow for transmission in the entire heat distribution network at the moment t.

A multi-device site selection method for an integrated energy virtual power plant according to the foregoing description is provided, where a typical daily load in a planning period is selected, and a final planning solution is determined according to a state of the typical daily load.

A multi-device site selection method for an integrated energy virtual power plant according to the foregoing description is provided, where the multi-device site selection optimal planning model of the integrated energy virtual power plant includes one or more of a device operating constraint, an energy storage operating constraint, an electrical load requirement constraint, a thermal load requirement constraint, a device site selection state constraint, an equivalent load state constraint, a branch power transmission constraint, a pipeline flow transmission constraint, and a total power transmission constraint of the power distribution network.

A multi-device site selection method for an integrated energy virtual power plant according to the foregoing description is provided, where an objective function of the multi-device site selection optimal planning model of the integrated energy virtual power plant in the step 2 is:

$$\max \frac{1}{T} \sum_{t=1}^{T} E^t = \max \frac{1}{T} \sum_{t=1}^{T} (E_e^t + E_h^t)$$

in the formula, $$\frac{1}{T} \sum_{t=1}^{T} E^t$$

represents an average value of the comprehensive energy flow distribution entropy in an entire dispatching period.

A computer-readable storage medium stores instructions, where the instructions, when running, implement any site selection method described above.

BRIEF DESCRIPTION OF THE DRAWINGS

The following further describes the present invention in detail with reference to the accompanying drawings.

The sole FIGURE is a flowchart of a site selection method according to this application.

DETAILED DESCRIPTION

The following clearly and completely describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present invention.

A multi-device site selection decision method for an integrated energy virtual power plant in consideration of a comprehensive energy flow distribution entropy according to the present invention includes the following steps:

(1) For a balance problem of energy distribution in an energy network, based on a concept of "entropy" reflecting a disordered and chaotic state of a system in the field of thermodynamics, an index calculation method for a comprehensive energy flow distribution entropy reflecting energy distribution balance in the energy network is proposed.

(2) With a goal of improving energy distribution balance, that is, a goal of maximizing a comprehensive energy flow distribution entropy index, a multi-device site selection optimal planning model of the virtual power plant is established, where in the optimal planning model, a device site selection state and a device operating state are taken as decision variables, and an objective function of the model is:

$$\max \frac{1}{T} \sum_{t=1}^{T} E^t = \max \frac{1}{T} \sum_{t=1}^{T} (E_e^t + E_h^t) \quad (4)$$

in the formula, $$\frac{1}{T} \sum_{t=1}^{T} E^t$$

represents an average value of the comprehensive energy flow distribution entropy in an entire dispatching period; and the model includes constraint conditions as follows:

(21) Device Operating Constraints:

$$0 \leq P_{CHP,t} \leq P_{CHP}^{fix} \quad (5)$$

$$0 \leq P_{GT,t} \leq P_{GT}^{fix} \quad (6)$$

$$0 \leq H_{GB,t} \leq H_{GB}^{fix} \quad (7)$$

(22) Energy Storage Operating Constraints:

$$-P_{ESS}^{fix} \leq P_{ESS,t} \leq P_{ESS}^{fix} \quad (8)$$

$$SOC_{min} \leq SOC^t \leq SOC_{max} \quad (9)$$

where $P_{ESS,t}$ represents a charging/discharging power for energy storage at a moment t, where if the value is positive, it indicates charging, or if the value is negative, it indicates discharging; $P_{ESS}^{fix}$ represents an upper limit of the charging/discharging power for energy storage; and $SOC^t$ is a storage capacity for energy storage at the moment t, $SOC_{min}$ is a minimum value of the storage capacity for energy storage, and $SOC_{max}$ is a maximum value of the storage capacity for energy storage.

(23) Electrical Load Requirement Constraint:

$$P_{CHP,t} + P_{GT,t} + P_{ESS,t} + P_{ele,t} = \sum_{i=1}^{N_i} P_{i,t}/(1-\alpha) \quad (10)$$

where $P_{ele,t}$ represents an electricity supply power at the moment t; $P_{i,t}$ represents an electrical load power of a node i of a power distribution network at the moment t; $N_i$ is a total quantity of load nodes in the power distribution network; and $\alpha$ represents a comprehensive loss rate of the power distribution network.

(24) Thermal Load Requirement Constraints:

$$H_{CHP,t} + H_{GB,t} + H_{heat,t} = \sum_{j=1}^{N_j} H_{j,t}/(1-\beta) \quad (11)$$

$$H_{CHP,t} = \eta P_{CHP,t} \quad (12)$$

where $H_{heat,t}$ represents a heat supply power at the moment t; $H_{CHP,t}$ represents thermal output of a CHP set at the moment t; $H_{i,t}$ represents a thermal load power of a node j of a heat distribution network at the moment t; $N_j$ is a total quantity of load nodes in the heat distribution network; $\beta$ represents a comprehensive loss rate of the power distribution network; and $\eta$ represents an electricity-heat ratio coefficient of the CHP set.

(25) Device Site Selection State Constraints:

$$\sum_{i=1}^{N_i} \gamma_{GT,i} = 1 \quad (13)$$

-continued $$\sum_{i=1}^{N_i} \gamma_{ESS,i,i} = 1 \quad (14)$$

$$\sum_{j=1}^{N_j} \gamma_{GB,i} = 1 \quad (15)$$

$$\sum_{i=1}^{N} \gamma_{CHP,n-ij} = 1 \quad (16)$$

where $\gamma_{GT,i}$, $\beta_{ESS,i}$, $\gamma_{GC,i}$, and $\gamma_{CHP,n-ij}$ are installation location state variables of four devices respectively, and are all binary variables, and using $\gamma_{GT,i}$ as an example, if the value is 1, it indicates that a GT device is installed on a location of the node i. It should be noted that, n is a serial number of a coupling node of the power distribution network-heat distribution network, and i and j in n-ij represent node serial numbers of the coupling node in the power distribution network and the heat distribution network.

(25) Equivalent Load State Constraints:
for the independent node i of the power distribution network:

$$P'_{i,t} = P_{i,t} - \gamma_{GT,i} P_{WT,t} - \gamma_{ESS,i} P_{ESS,t} \quad (17)$$

for the coupling node i:

$$P'_{i,t} = P_{i,t} - \gamma_{GT,i} P_{WT,t} - \gamma_{ESS,i} P_{ESS,t} - \gamma_{CHP,n-ij} P_{CHP,t} \quad (18)$$

for the independent node j of the heat distribution network:

$$H'_{j,t} = H_{j,t} - \gamma_{GB,i} H_{GB,t} \quad (19)$$

for the coupling node j:

$$H'_{j,t} = H_{j,t} - \gamma_{GB,i} H_{GB,t} - \gamma_{CHP,n-ij} H_{CHP,t} \quad (20)$$

where $P'_{i,t}$ represents an equivalent load considering the node i of the power distribution network at the moment t after device installation; and $H^{j,t}$ represents an equivalent load considering the node j of the heat distribution network at the moment t after device installation.

(26) Branch Power Transmission Constraint:

$$\Delta P^{l,t} = \sum_{i=1}^{N_i} PTDF_i^l P'_{i,t} \leq P_l \quad (21)$$

where $P_l$ is a maximum transmission capacity of a line l; and $PTDF_i^l$ represents a power transmission distribution factor of an electrical load at the node i for the line l, and is a pre-approved value.

(27) Pipeline Flow Transmission Constraint:

$$\Delta m^{p,t} = \sum_{j=1}^{N_j} FTDF_i^p H'_{j,t} \leq m_p \quad (22)$$

where $m_p$ is a maximum transmission flow of a pipeline p; and $FTDF_i^p$ represents a flow transmission distribution factor of a thermal load at the node j for the pipeline p, and is a pre-approved value.

(28) Total Power Transmission Constraint of the Power Distribution Network:

$$\Delta P_{total}^{j,t} = \sum_{i=1}^{N_l} \Delta P^{l,t} \quad (23)$$

where $N_l$ is a total quantity of lines of the power distribution network.

(29) Total Flow Transmission Constraint of the Heat Distribution Network:

$$\Delta m_{total}^{p,t} = \sum_{p=1}^{N_p} \Delta m^{p,t} \quad (24)$$

where $N_p$ is a total quantity of pipelines of the heat distribution network.

(3) An optimal solution of the optimal planning model in the step 2 is used as a reference, to obtain a multi-device site selection decision solution of the integrated energy virtual power plant.

Additionally, the present invention further proposes a computer-readable storage medium, storing computer instructions.

To sum up, in the foregoing example of the present invention, at first, based on a concept of "entropy" reflecting a disordered and chaotic state of a system in the field of thermodynamics, an index calculation method for a comprehensive energy flow distribution entropy reflecting energy distribution balance in the energy network is proposed, to calculate a comprehensive energy flow distribution entropy through power flow distribution in a power distribution network and flow distribution in a heat distribution network. Then, under a condition that capacity of each device is known, establishing a multi-device site selection optimal planning model of the virtual power plant with a goal of maximizing a comprehensive energy flow distribution entropy index, thereby determining a device site selection state and a device operating state in the multi-device site selection optimal planning model of the integrated energy virtual power plant.

The foregoing displays and describes basic principles, main features of the present invention and advantages of the present invention. A person skilled in the art may understand that the present invention is not limited to the foregoing embodiments. Descriptions in the embodiments and this specification only illustrate the principles of the present invention. Various modifications and improvements are made in the present invention without departing from the spirit and the scope of the present invention, and these modifications and improvements shall fall within the protection scope of the present invention.

What is claimed is:

1. A multi-device site selection method for an integrated energy virtual power plant, comprising:
   step 1: constructing a calculation method for calculating a comprehensive energy flow distribution entropy through power flow distribution in a power distribution network and flow distribution in a heat distribution network, to reflect energy distribution balance in an energy network;
   step 2: under a condition that capacity of a device is known, establishing a multi-device site selection optimal planning model of the integrated energy virtual power plant with a goal of maximizing a comprehensive energy flow distribution entropy index; and
   step 3: determining an installation location of the device of the integrated energy virtual power plant in the energy network, and determining an operating state of the device.

2. The multi-device site selection method for an integrated energy virtual power plant according to claim 1, wherein in the multi-device site selection optimal planning model of the integrated energy virtual power plant, a device site selection state and a device operating state are taken as decision variables.

3. The multi-device site selection method for an integrated energy virtual power plant according to claim 1, wherein the calculation method is:

$$E^t = E_e^t + E_h^t, \quad (1)$$

in the formula, $E^t$ represents the comprehensive energy flow distribution entropy of the power distribution network and the heat distribution network at a moment t; $E_e^t$ represents an energy flow distribution entropy in the power distribution network at the moment t; and $E_h^t$ represents an energy flow distribution entropy in the heat distribution network at the moment t;

$$E_e^t = -\sum_{l=1}^{N_l} \frac{\Delta P^{l,t}}{\Delta P_{total}^{l,t}} \ln\left(\frac{\Delta P^{l,t}}{\Delta P_{total}^{l,t}}\right) \quad (2)$$

in the formula, Nl represents a total quantity of branches of the power distribution network; l represents a serial number of a branch; $\Delta P^{l,t}$ represents an active power for transmission on the branch l at the moment t; and $\Delta P_{total}^{l,t}$ represents an active power for transmission in the entire power distribution network at the moment t; and $$E_h^t = -\sum_{p=1}^{N_p} \frac{\Delta m^{p,t}}{\Delta m_{total}^{p,t}} \ln\left(\frac{\Delta m^{p,t}}{\Delta m_{total}^{p,t}}\right) \quad (3)$$

in the formula, Np represents a total quantity of pipelines of the heat distribution network; p represents a serial number of a pipeline; $\Delta m^{p,t}$ represents a flow for transmission on the pipeline p at the moment t; and $\Delta m_{total}^{p,t}$ represents a flow for transmission in the entire heat distribution network at the moment t.

4. The multi-device site selection method for an integrated energy virtual power plant according to claim 1, wherein a typical daily load in a planning period is selected, and a final planning solution is determined according to a state of the typical daily load.

5. The multi-device site selection method for an integrated energy virtual power plant according to claim 1, wherein the multi-device site selection optimal planning model of the integrated energy virtual power plant comprises one or more of a device operating constraint, an energy storage operating constraint, an electrical load requirement constraint, a thermal load requirement constraint, a device site selection state constraint, an equivalent load state constraint, a branch power transmission constraint, a pipeline flow transmission constraint, and a total power transmission constraint of the power distribution network.

6. The multi-device site selection method for an integrated energy virtual power plant according to claim 1, wherein an objective function of the multi-device site selection optimal planning model of the integrated energy virtual power plant in the step 2 is:

$$\max \frac{1}{T} \sum_{t=1}^{T} E^t = \max \sum_{t=1}^{T} (E_e^t + E_h^t)$$

in the formula, $$\frac{1}{T} \sum_{t=1}^{T} E^t$$

represents an average value of the comprehensive energy flow distribution entropy in an entire dispatching period.

7. A computer-readable storage medium, storing instructions, wherein the instructions, when running, implement the site selection method according to claim 1.

* * * * *